United States Patent
Candor et al.

[15] 3,667,130

[45] *June 6, 1972

[54] LIQUID REMOVING APPARATUS AND METHOD

[72] Inventors: Robert R. Candor, 5940 Munzer Road, Miami Township, Ohio 45459; James T. Candor, 5440 Cynthia Lane, Washington Township, Ohio 45429

[*] Notice: The portion of the term of this patent subsequent to Oct. 15, 1985, has been disclaimed.

[22] Filed: July 7, 1969

[21] Appl. No.: 842,807

Related U.S. Application Data

[63] Continuation-in-part of Ser. No. 696,639, Jan. 9, 1968, which is a continuation-in-part of Ser. No. 639,354, May 18, 1967, Pat. No. 3,405,452, which is a continuation-in-part of Ser. No. 532,266, Mar. 7, 1966, Pat. No. 3,330,136, which is a continuation-in-part of Ser. No. 219,587, Aug. 27, 1962, Pat. No. 3,238,750, and a continuation-in-part of Ser. Nos. 748,298, July 29, 1968, and Ser. No. 769,155, Oct. 21, 1968, and Ser. No. 807,539, Mar. 17, 1969.

[52] U.S. Cl. ...................................................................34/1
[51] Int. Cl. ...........................................................B01k 5/00
[58] Field of Search .........................................................34/1

[56] References Cited

UNITED STATES PATENTS

3,405,452  10/1968  Candor et al. ..............................34/1

*Primary Examiner*—Charles Sukalo
*Attorney*—Candor, Candor & Tassone

[57] ABSTRACT

This disclosure relates to a laundry apparatus, paper making apparatus or the like wherein the moisture or liquid in the wet laundry, food materials, paper slurry or the like, disposed therein is removed by an electrostatic means that provides a differential in the potential of the moisture in the laundry, food materials, paper slurry or the like and an electrode means for the moisture to tend to cause the moisture to leave the laundry, food materials, paper slurry or the like and move toward the electrode means. Such electrode means can comprise a suction nozzle which tends to draw a large volume of air through the laundry, food materials, paper slurry or the like adjacent thereto to also tend to direct the moisture from the laundry, food materials, paper slurry or the like toward the electrode means.

22 Claims, 9 Drawing Figures

PATENTED JUN 6 1972

INVENTORS
ROBERT R. CANDOR &
JAMES T. CANDOR

BY
Candor & Candor

THEIR ATTORNEYS

PATENTED JUN 6 1972 3,667,130

INVENTORS
ROBERT R. CANDOR &
JAMES T. CANDOR

BY
*Candor & Candor*

THEIR ATTORNEYS

INVENTORS
ROBERT R. CANDOR &
JAMES T. CANDOR

BY
*Candor & Candor*
THEIR ATTORNEYS

LIQUID REMOVING APPARATUS AND METHOD

This application is a Continuation-in-part of co-pending application, Ser. No. 696,639, filed Jan. 9, 1968, which, in turn, is a Continuation-in-part of its co-pending application, Ser. No. 639,354, filed May 18, 1967, now U.S. Pat. No. 3,405,452, which, in turn, is a Continuation-in-part of its co-pending patent application, Ser. No. 532,266, filed Mar. 7, 1966, now U.S. Pat. No. 3,330,136, which, in turn, is a Continuation-in-part of its co-pending application Ser. No. 219,587, filed Aug. 27, 1962, now U.S. Pat. No. 3,238,750. This application is also a Continuation-in-part of co-pending applications, Ser. Nos. 748,298, filed July 29, 1968, 769,155, filed Oct. 21, 1968, and 807,539, filed Mar. 17, 1969.

This invention relates to an improved laundry machine and method, and/or to a moisture or liquid bearing material treating machine or method.

Such machine and method for treating liquid or moisture bearing materials may remove such liquid or moisture for the purpose of dehydrating food materials, paper materials or other materials containing liquids or moisture that may be electrostatically treated for various purposes, such as to remove such liquid or moisture from such materials.

Such liquids may be dielectric or electrically conductive liquids which may be electrostatically treated to remove such liquids from the materials containing them.

These liquids may have different surface tensions than water, if desired, to improve the electrostatic removal of the liquids from their bearing materials.

Such liquids may have different viscosities than water to improve the electrostatic removal of the liquids from their bearing materials.

The liquids may be highly vaporizable and easily removable from their bearing materials so that such liquids may be almost completely removed from their bearing materials by electrostatic means and then the small remaining portions of such liquids can be vaporized from their bearing materials at low temperatures and at small cost.

Such liquids may be easily removable from their bearing materials and can then be introduced into new bearing materials without substantial loss of liquid.

For example, in paper or other product manufacture, a coalescent or other liquid that need not be vaporized may be substituted for water, and such material may be electrostatically removed from the paper forming material or other material. Such removed liquid can then be recirculated into other paper forming material or other material, with or without purification of such liquid before reuse.

This procedure, when used in paper making and other industries, can overcome the objections to high water polution now prevailing against such industries.

Such liquids may be chosen to cause the liquid and its liquid bearing material to become electrostatically charged at one potential by friction or chemical action and the electrode construction may be charged with an opposite potential to remove such liquid to produce paper, cloth or other textiles. Such liquids may include acrylic acid and derivatives thereof.

Such liquids may be injected into their bearing materials by electrostatic force pulling or pushing on the liquid on top of the bearing material by reason of a relatively high surface tension of the liquid that will push out and replace the original liquid of the material, and, if desired, portions of such replacing or initially introduced liquids may be removed from the bottoms of such bearing materials by electrostatic means.

Such liquids may be homogeneously mixed with each other and may be injected into a bearing material by electrostatic force acting on such liquids or in any other manner and thereafter these injected liquids may be separated or stratified into one or more layers in the bearing material. One or more of such separated or stratified layers may be removed electrostatically at the bottoms of said bearing material. The homogeneously mixed liquids may be forced into the bearing materials by electrostatic forces acting on the surface tensions of such mixed liquids.

In particular, one embodiment of this invention comprises a substantially air-tight and non-collapsible confining means or structure having a rotatable foraminous carriage being adapted to support laundry or the like therein. Means are provided for selectively reducing and maintaining the air pressure inside the confining means at any selected pressure below the air pressure outside of the confining means.

In this manner, when the laundry machine is being utilized as a drying machine for removing moisture from wet laundry disposed in the foraminous carriage, the moisture in the wet laundry more readily evaporates in the reduced atmosphere in the confining means than it would evaporate if the confining means contained air at normal atmospheric conditions.

By heating the reduced atmosphere in the confining means to a temperature to cause the moisture in the wet laundry to boil, more rapid evaporation is effected without having to raise the temperature thereof to the normal boiling point of the moisture. In this same vein, auxiliary heating means can be dispensed with the air pressure in the confining means is lowered to such an extent that the latent heat of the wet laundry is sufficient to cause the moisture to boil at the reduced atmospheric conditions.

When the laundry machine is being utilized to treat laundry with water or the like, the atmosphere in the confining means can be lowered to such an extent that the latent heat of the water causes it to boil whereby the bubbling action of the boiling water further enhances the treating of the laundry by the water or the like disposed in the laundry machine. In this same vein, auxiliary heating means may be utilized to supplement the raising of the temperature of the water to boil at the reduced air pressure.

In addition, electrostatic means of this invention can be utilized in combination with the previously described suction means or by itself to remove liquid from the wet laundry.

Therefore, it can be seen that at least one of the apparatus of this invention can be a washing machine, a drying machine, or a combination washing and drying machine and is thus designated as a "laundry machine" but may have uses other than operating on laundry and is not to be limited to such use. For example, the same can be utilized for a dry cleaning machine, etc.

Further, one of the features of this Continuation-in-part application is to illustrate, describe and claim how certain of the previously described features of the electrostatic means, with or without the previously described suction means, can be utilized in improving the making or treating electrostatically of liquid or moisture bearing materials such as the dehydration of food, making of paper or the like.

Accordingly, it is an object of this invention to provide an improved moisture or liquid bearing material treating apparatus, such as for dehydrating of food, making of paper, etc., and having one or more of the novel features set forth above as hereinafter shown or described.

Another object of this invention is to provide an improved moisture or liquid bearing material treating method, such as for dehydrating of food, for making paper and the like having one or more of the novel features set forth above or hereinafter shown or described.

Other objects, uses and advantages of this invention are apparent upon a reading of this description which proceeds with reference to the accompanying drawings forming a part thereof and wherein:

Figure 1:
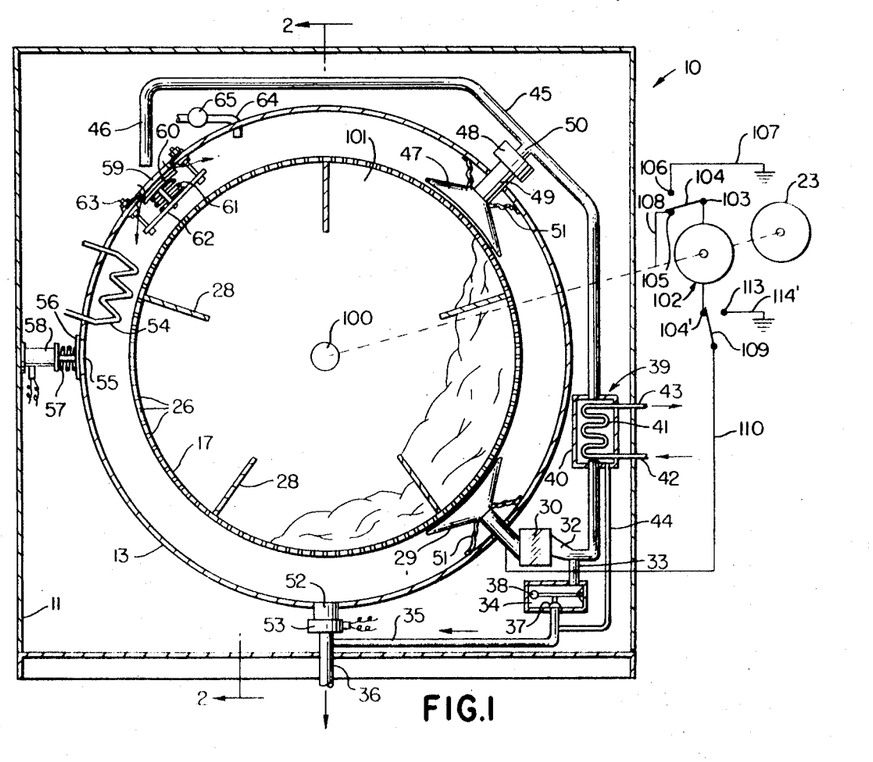
FIG. 1 is an axial cross-sectional view of an improved laundry machine of this invention.
Figure 2:
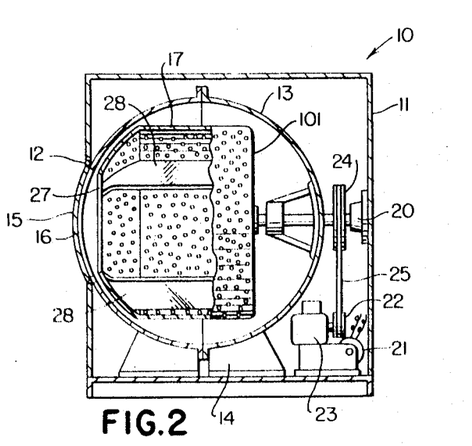
FIG. 2 is a reduced cross-sectional view of the machine illustrated in FIG. 1 and is taken on line 2—2 thereof.

Referring now to FIGS. 1 and 2, an improved laundry machine of this invention is generally indicated by the reference numeral 10 and comprises an outer frame or casing 11 having an opening 12 for the passage of laundry and the like into and out of the machine 10.

A substantially air-tight, stationary drum 13 is disposed in the casing 11 and is supported therein by suitable supports 14. The drum 13 may have any desired configuration other than the spheroidal configuration illustrated, the important feature being that the drum 13 will not collapse when the air pressure inside the drum 13 is lowered to the desired pressure in a manner and for a purpose hereinafter described.

The drum 13 has an opening 15 provided therein for the passage of laundry and the like into and out of the drum 13. A suitable door 16 is hingedly mounted to the drum 13 and is adapted to open and close the opening 15 in the drum 13, the door 16, when in the closed position, being substantially air-tight and non-collapsible.

A foraminous carriage is disposed in the drum 13 and is carried on a shaft 18 passing through the drum 13 and rotatably supported in bearings 19 and 20 respectively carried by the drum 13 and the casing 11. In this manner, the carriage 17 can be rotated in the drum 13 by a motor 21 driving a pulley 22 through a reducer 23, the pulley 22 being interconnected to a pulley 24 carried on the shaft 18 by a suitable belt drive 25 or the like.

The carriage 17 has a plurality of openings 26 passing therethrough, the openings 26 being large enough to readily permit the passage of water or air or both therethrough.

An opening 27 is formed in one end of the carriage 17 to permit the passage of laundry into and out of the carriage 17, the opening 27 being aligned with the openings 15 and and 12 provided respectively in the drum 13 and casing 11.

Suitable baffles 28 are carried on the inside peripheral surface of the carriage 17 to lift clothes on the rising side of the carriage 17 as the carriage rotates.

A suction nozzle 29 is disposed between the carriage 17 and drum 13 and is operatively interconnected to the inlet side of a suitable suction pump 30 by a conduit means 31.

The suction nozzle 29 has its open end disposed adjacent the outer peripheral surface of the carriage 17 and can extend completely across the carriage 17 or partially across the same as desired. Further, the nozzle 29 may be movable toward and away from the carriage 17 in any of the manners set forth in the co-pending application, Ser. No. 839,232, filed Sept. 10, 1959, and entitled Laundry Machine.

In any event, the suction pump 30, when operating, is adapted to suck moisture and air from wet laundry disposed in the carriage 17 directly through the foraminous carriage 17 into the nozzle 20 and, thus, into the inlet side of the pump 30 in a manner more fully described hereinafter.

The moisture, vapor and air drawn from the drum 13 is forced out of the outlet side of the pump 30 into a conduit means 32 which decreases in cross-sectional area to cause the air delivered by the pump 30 to be compressed in the conduit means 32 and, thereby, give up at least part of its moisture into the conduit means 32.

The moisture present in the conduit means 32 flows downwardly through a conduit 33 into a compartment 34, the bottom of the compartment being interconnected to a conduit 35 leading to a drain conduit 36.

A suitable float valve 37 is disposed in the compartment 34 and normally closes off the conduit 35. However, as the moisture collects in the compartment 34, the rising level of the moisture floats the float 38 upwardly to open the valve 37 and let part of the moisture in the compartment flow to the drain 36.

In this manner, the compressed air in the conduit 32 does not pass to drain 36 because there is always a certain amount of moisture covering the inlet of the conduit 35.

The conduit means 32 lead to a suitable condenser 39 comprising a compartment 40 having a cooling coil 41 disposed therein. Suitable cooling means, such as water and the like, can enter the coil 41 through the inlet 42 and be expelled out through the outlet 43.

In this manner, the air being forced into the compartment 40 from the conduit 32, passes over the cooling coil 41 whereby any vapor in the air condenses and falls to the bottom of the compartment 40, the outlet end of the conduit 32 being disposed above the bottom of the compartment 40 to prevent the condensed moisture from entering the conduit 32.

Condensed moisture in the compartment is fed to the conduit 35 by a conduit 44, the end of the conduit 44 disposed in the compartment 40 being below the free end of the conduit 32.

After the air passes over the cooling coil 41, the dried air can be expelled to the atmosphere or vented, as desired.

Alternately, the air can be fed from the cooling chamber 40 through a conduit 45 having an outlet end 46 so positioned for a purpose hereinafter described.

A second suction means can be carried by the machine 10 and can comprise a suction nozzle 47 disposed closely adjacent the carriage 17 and inside the drum 13, the nozzle 47 being interconnected to the inlet side of a suction pump 48 by a conduit 49.

The outlet side of the pump 48 is interconnected to the inlet side of a suction pump 48 by a conduit 49.

The outlet side of the pump 48 is interconnected to the conduit 45 by a branch conduit 50.

The conduits 31 and 49 pass through the drum 13 and have flexible sealing means 51 connected thereto and to the drum 13 to prevent air and water leakage from drum 13 into the housing 11.

The interior of the drum 13 is interconnected to the drain conduit 36 by a conduit 52, the conduit 52 having a suitable solenoid operated valve 53 therein.

An electrical heater 54 is disposed between the drum 13 and carriage 17 and is operated in a conventional manner.

The drum 13 has an opening 55 formed therein which is controlled by a valve member 56 normally urged to the closed position by a spring 57. The valve member 56 is moved to the opened position thereof by the energization of a solenoid 58.

Another opening 59 is formed in drum 13 adjacent the outlet 46 of the conduit 45, the opening 59 being controlled by a valve member 60 normally being urged to its closed position by a spring 61 disposed between the valve member 60 and a support 62 adjustably carried on bolts 63 attached to the drum 13.

In this manner, the force of the compression spring 61 tending to hold the valve member 60 in the closed position thereof can be selectively varied.

Water is adapted to be fed into the drum 13 by a conduit 64 having conventional valve means 65.

The operation of the laundry machine 10 will now be described.

Soiled laundry or the like and soap or detergent are introduced into the carriage 17 of the laundry machine 10 through the door 15 in a conventional manner.

Thereafter, the door 15 is closed and wash water of the desired temperature is adapted to be introduced into the drum 13 through the conduit 64, the valve means 65 and 53 being selectively operated to permit the water introduced into the drum 13 to rise to the desired level.

Thereafter, the carriage 17 is rotated to cause a tumbling action of the clothes through the wash water in a conventional manner.

During this washing cycle, the solenoid 58 can be operated to open the valve member 56 so that the washing action can take place with normal atmospheric conditions existing in the drum 13.

Alternately, one feature of this invention can be utilized during the washing cycle of the laundry machine 10.

In particular, the solenoid 58 can be so actuated that the valve member 56 is disposed in sealing relation against the opening 55 in the drum 13.

Thereafter, the suction pump 48 is operated to cause the suction nozzle 47 to tend to reduce the pressure of the air in the drum 13 below normal atmospheric conditions existing outside the drum 13.

By proper regulation of the force of the compression spring 61 acting on the valve member 60, the suction means 47 and the valve means 60 permits the air pressure inside the drum 13 to be reduced to and maintained at a selected pressure below normal atmospheric pressure.

The amount of reduction of the air pressure in the drum 13 coupled with the latent heat of the wash water will cause the wash water to boil even though the wash water is at approximately 140° Fahrenheit or the like.

It is believed that this boiling action of the wash water during the wash cycle will enhance the dirt removing action of the wash water on the soiled laundry or the like.

While the heater 54 is illustrated as being in the upper region of the laundry machine 10 it is to be understood that the heater 54 can be disposed in the lower region thereof whereby the same will be submerged in the wash water so that the heater 54 can be utilized to heat up or maintain the temperature of the wash water at a selected temperature so that the suction means 47 can cause the wash water to continuously boil during the wash cycle.

Alternately another heater could be utilized.

Thereafter, the wash water is drained through the drain 52 by opening the solenoid valve 53 in a conventional manner and opening the valve member 56.

Subsequently, one or more rinse cycles can be utilized whereby rinse water is introduced through the conduit 64 in much the same manner as the wash water and the carriage 17 is rotated to tumble the laundry through the rinse water.

During the rinsing cycle it may be desired to also use the suction means 47 to reduce the air pressure in the drum 13 below normal atmospheric pressure, and, in combination with the valve means 60, to maintain the air pressure in the drum 13 at a selected reduced air pressure.

Thus, the rinse water will also tend to bubble or boil, the rinse water either being hot itself or being heated by the heater means 54 as desired.

After the rinse water has been drained from the drum 13, the laundry machine 10 is now adapted to perform a drying operation.

After the water has been drained from the drum 13 by opening the valve means 53, the suction pump 30 is turned on whereby the suction nozzle 29 forms a sucking action on the clothes being accumulated in the carriage 17 to tend to draw moisture therefrom out to the outlet 32 as set forth in the aforementioned co-pending application.

During this drying action, the carriage 17 can be continuously rotated to continuously bring new accumulations of clothes adjacent to the suction nozzle 29.

However, while the suction nozzle 29 is removing moisture from the wet laundry, the valve means 56 can be closed and the suction means 29, in combination with the valve means 60, can reduce and maintain the air pressure in the drum 13 at a selected air pressure below the normal atmospheric air pressure outside the drum 13.

If the air pressure inside the drum 13 is reduced to such an extent that the latent heat of the wet laundry in combination with the reduced air pressure will cause the moisture in the wet clothes to more readily evaporate than if the air pressure was not reduced.

Further, the heater element 54 can be turned on whereby the air that is drawn through the valve means 60 passes over the heater 54 to heat up the wet laundry so that the moisture in the wet laundry more readily tends to evaporate in the reduced atmosphere produced in the drum 13.

Thus, as the moisture is being continuously withdrawn or sucked from the wet laundry by the suction means 29, the suction means 29 also cooperates with the valve means 60 to reduce and maintain the air pressure in the drum 13 at a selected reduced air pressure below the normal atmospheric air pressure outside the drum 13 to more readily evaporate the moisture from the wet laundry.

If desired, the suction means 47 can also be operating during this time to assist the nozzle in reducing the air pressure in the carriage 13.

Alternately, only the suction means 47 can be utilized during the drying action whereon the suction means 47 cooperates with the valve means 60 to reduce the air pressure in the drum 13 to such an extent that, in combination with either the heated air coming through the valve means 60 and over the heater element 54 or the latent heat of the wet laundry, the moisture in the wet laundry tends to readily evaporate and pass out through the suction nozzle 47 in the above manner.

If desired, the combination of the heat of the wet laundry and the reduced air pressure can be so arranged that moisture in the wet laundry actually boils at a low temperature that will not adversely affect the laundry.

Therefore, it can be seen that the method and apparatus of this invention not only provides improved means for treating laundry or the like with water or the like by causing the water to boil or bubble, but also the method and apparatus of this invention provides improved means for removing moisture from wet laundry by a suction action and/or by an evaporative action for drying the laundry.

After the laundry has been dried in the above manner, the operation of the machine 10 is terminated and the dry laundry can be removed from the laundry machine 10 in the conventional manner.

While the above operation of the laundry machine 10 has been described as being a continuous operation, it is to be understood that each of applicants' novel features can be separately used or in various combinations thereof in other laundry machines or the like.

For example, applicants' drying apparatus need not be utilized with a washing machine and conversely, applicants' washing apparatus may not be utilized with a drying machine.

While laundry machine 10 has been described as completely drying the wet laundry, it is to be understood that the drying operations of applicants' invention can be utilized merely for removing enough moisture from the wet laundry thereof for the desired purpose whereby the conventional centrifuging operation can be eliminated.

Figure 3:
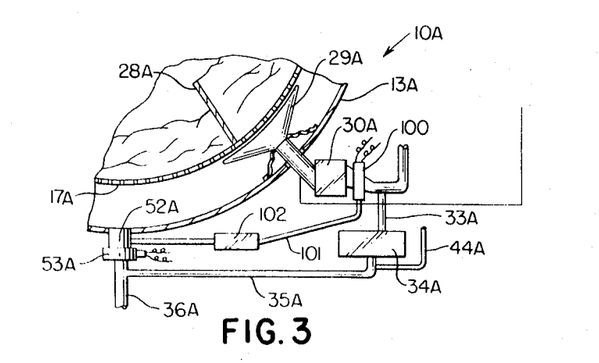
FIG. 3 is a view similar to FIG. 1 and illustrates another embodiment of this invention.

Another embodiment of this invention is generally indicated by the reference numeral 10A and parts thereof similar to the embodiment of FIG. 1 are indicated by like reference numerals followed by the reference letter "A".

As illustrated in FIG. 3 the pipe 32A has a solenoid operated valve 100, which, when energized during the wash cycle, prevents the outflow from the suction means 30A from passing beyond the valve means 100 and directs the outflow of the suction means 30A into a pipe 101 leading to the drain pipe 52A above the valve means 53A, the pipe 101 having a filter means 102 therein. When the valve 100 is de-energized, the valve closes the pipe 101 from the outflow of the suction means 30A and permits the outflow from the suction means 30A to pass beyond the valve means 100 into the pipe 32A for the moisture removal cycle previously described.

When the machine 10A is being utilized in the wash cycle thereof, the suction means 30A is turned on and the valve means 100 is energized whereby the suction means causes a large volume of the body of wash water in the confining means 13A to be drawn through the laundry on the foraminous carriage 17A and through the foraminous carriage 17A into the nozzle inlet means 29A and suction means 30A and, by means of the valve means 100, through the pipe 101 and filter 102 back to the confining means 13A because the valve means 53A is closed below the pipe 101 at the drain pipe 52A.

In this manner, suction means 30A causes the wash water to thoroughly wash the laundry as the carriage 17A is rotating because a large volume of wash water is being forced through the laundry into the aligned nozzle means 29A, the filter 102 removing dirt and lint from the wash water before it is returned to the confining means 13A. This wash cycle can also be accomplished with the other features of the washing operation of the machine 10 previously described. Of course, the rinsing operation could be the same for the machine 10A as the described wash cycle therefor.

When the machine 10A performs its moisture removal cycle, the valve means 100 is de-energized and the valve 53A is opened whereby the body of liquid drains out of the confining means 13A through the pipe 36A. Thereafter, the suction means 30A is utilized in the same manner as the suction means 30 previously described for the moisture removal and/or drying operation for the wet laundry remaining in the confining means 13A.

While the apparatus 10 and 10A are previously described as relying on the large volume of air being drawn through the laundry and foraminous portions 17 and 17A into the nozzle inlet means 29 and 29A to remove the moisture from the laundry for a drying operation, it is to be understood that such moisture removal portion can be assisted by an electrostatic feature of this invention.

As illustrated in FIG. 1, the motor means 23 of FIG. 2 is illustrated schematically in FIG. 1 for rotating a shaft means 100 of the apparatus 10 that is interconnected to the end wall 101 of the foraminous carriage 17 so as to be in electrical conductive relationship with the carriage 17 while being electrically insulated from its surrounding tub 13 and frame means 11 as well as from the motor 23 as will be apparent hereinafter.

The shaft 100 rotates an electrostatic machine or apparatus 102 in unison with its rotation of the foraminous drum 17 whereby the electrostatic device 102 creates a differential between two terminal means 103 and 104' thereof when the shaft 100 is rotated by the motor 23 in a manner well known in the art.

A switch blade 104 is electrically interconnected to the terminal 103 of the electrostatic device 102 and is adapted to be moved between terminals 105 and 106, the terminal 106 being interconnected to the ground by a lead 107 and the terminal 105 being interconnected to the conductive portion of the shaft 100 by a lead 108.

Figure 4:
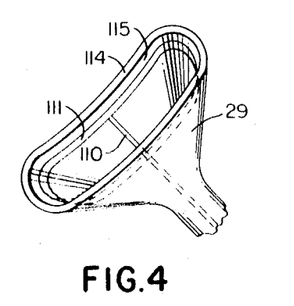
FIG. 4 is a fragmentary perspective view of a typical nozzle means for the apparatus of FIGS. 1 or 3 and illustrates the electrode means therefor.
Figure 5:
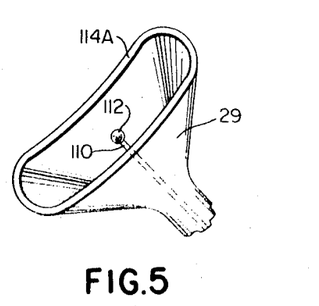
FIG. 5 is a view similar to FIG. 4 and illustrates another embodiment of this invention.

Another switch blade 109 is provided and is electrically interconnected by a lead 110 to an electrode means inside the suction nozzle means 29, such as the electrode means 111 of FIG. 4 or electrode means 112 of FIG. 5. The switch blade 109 is movable between the terminal 104' of the electrostatic machine 102 and a terminal 113 interconnected to ground by a lead 114'.

The electrode means 111 for the nozzle means 29 of FIG. 4 is recessed below the opened end 114 thereof and extends completely around the inside peripheral surface 115 thereof, the electrode 111 being completely electrically insulated from the nozzle means 29 in any suitable manner, such as by forming the nozzle means 29 from a non-conductive material. However, in the embodiment of FIG. 5, the electrode 112 is disposed centrally in the open end 114A of the nozzle 29 while being recessed below the open end 114A and also being suitably electrically insulated from the nozzle means 29 of the supporting lead means 110.

If desired, the electrode means 111 and 112 can comprise one or more electrodes, be pointed or shaped other than illustrated, and can be insulated in the manner set forth in the aforementioned co-pending patent applications, Ser. Nos. 748,298, 769,155 and 807,539, to prevent grounding thereof by the removed moisture.

The operation of the apparatus 10 utilizing the electrostatic means 102 will now be described in connection with a drying operation.

After the laundry has been washed in the manner previously described and the body of treating liquid has been removed through the drain 52 in the manner previously described, the drum 17 is rotated by the motor 23 and tumbles the laundry in the drum 17 while the pump 30 is being operated to tend to draw a large volume of fluid through the laundry and foraminous surface 17 into the nozzle inlet means 29 for the drying operation previously described.

During this drying operation, the switch blades 109 and 104 are either manually or automatically moved from their respective ground terminals 113 and 106 against the terminals 104' and 105 to create a potential differential between the drum 17 and the electrode means 111 or 112 of the suction nozzle means 29. Because a potential differential now exists between the electrode 111 or 112 of the nozzle means 29 and the moisture in the laundry being tumbled in the rotating drum 17, not only does the large volume of air being directed into the nozzle inlet means 29 through the laundry and foraminous portion 17 by the pump 30 cause the moisture in the laundry to enter the nozzle inlet means 29 in the manner previously described, but also the potential differential between the moisture in the laundry and the electrode 111 or 112 of the nozzle means 29 causes the moisture to enter the nozzle means 29 in a manner believed to be at a faster rate than if the electrostatic device 102 was not utilized.

Further, by providing the foraminous drum 17 with a potential by the electrostatic device 102, such potential is also created for the moisture in the laundry as the same comes into contact with the drum 17 so that a relatively large potential differential is created between the moisture in the layer of laundry disposed against the drum 17 and the electrode 111 or 112 of the nozzle means 29 when that particular layer of laundry comes into alignment with the nozzle inlet opening 114 or 114A to cause the moisture to pass from the laundry through the foraminous surface 17 into the nozzle inlet means 29.

Of course, in the above operation of the apparatus 10, when utilizing the electrostatic device 102, the electrostatic device could still create such potential differential with only the switch blade 109 disposed against the terminal 104' and the switch blade 104 being connected to the terminal 106 leading to the ground so that the drum 17 need not be charged by the electrostatic device 102 to still accomplish the electrostatic moisture removal operation set forth above. Also, the carriage or drum 17 could be connected to ground during the time the electrode means 111 or 112 are being charged for their moisture removal operation.

In addition, such electrostatic moisture removal operation can take place while the interior of the casing 13 is at subatmospheric condition as previously described.

While the apparatus 10 has been described as requiring or utilizing the electrostatic device 102 in combination with the suction pump 30, it may be found that the suction means 30 can be completely eliminated and that moisture removal can be provided solely by electrostatic means.

Figure 6:
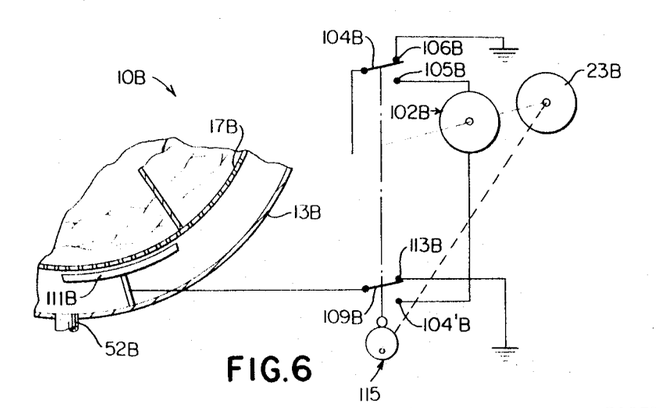
FIG. 6 is a view similar to FIG. 3 and illustrates still another embodiment of this invention.

For example, another embodiment of this invention is generally indicated by the reference numeral 10B in FIG. 6 and parts thereof similar to the apparatus 10 of FIG. 1 are indicated by like reference numerals followed by the reference letter "B".

As illustrated in FIG. 6, the foraminous drum 17B is rotated by the electric motor means 23B which also drives the electrostatic device 102B in the manner previously described and being adapted to have its terminals 104'B and 105B respectively interconnected to an electrode means 111B and the foraminous drum 17B by switch blades 109B and 104B, the electrode means 111B being one or more electrodes suitably shaped and insulated or uninsulated, as desired.

However, the electrode means 111B is not disposed in a nozzle means 29 in the manner previously described and can merely comprise a relatively large plate as illustrated or shaped otherwise while being disposed closely adjacent the rotating drum 17B. The switch blades 109B and 104B are adapted to be cycled in unison between the terminals 113B and 106B leading to ground and the terminals 104'B and 105B leading to the electrostatic device 102B by a camming arrangement 115 driven by the motor means 22B.

In this manner, both the electrode means 111B and drum 17B will be cycled by the cam means 115 to ground and to the electrostatic device 102B to respectively have a like potential and a potential differential.

If desired, the cam 115 and its connection to switch blade 104B may be modified to maintain the switch blade 104B connected to its ground contact 106B at all times while moving or cycling switch blade 109B between the stationary contacts 113B and 104'B. This would also cause a potential differential between the clothes in the drum 178 at ground potential and the charged plate means 111B when such plate means 111B is charged by contact 104'B.

When the plate 111B is cycled to the ground, any moisture being retained thereon by the charged plate 111B would immediately run off the same by gravity and pass out of the tub 13B through the drain means 52B. However, when the potential differential is created between the plate 111B and the moisture in the laundry being tumbled by the rotating drum 17B, such potential differential causes the moisture in the tumbled laundry to be attracted to the plate 111B and pass out of the laundry and through the drum 17B as the laundry comes into alignment with the plate 111B.

Therefore, it can be seen that the improved features of this invention are to utilize either an electrostatic means by itself to remove moisture from wet laundry or the like or in combination with a suction device that also removes the moisture by tending to draw a large volume of air through the laundry and into a suction nozzle means. Also, it may be found that when the suction nozzle means is utilized in combination with the electrostatic means, the suction power required may be less than without the electrostatic means and the nozzle means may not be required to be in sealed relation with the drum, but only closely adjacent thereto whereby no friction or nozzle wear-out problems will exist.

Figure 7:
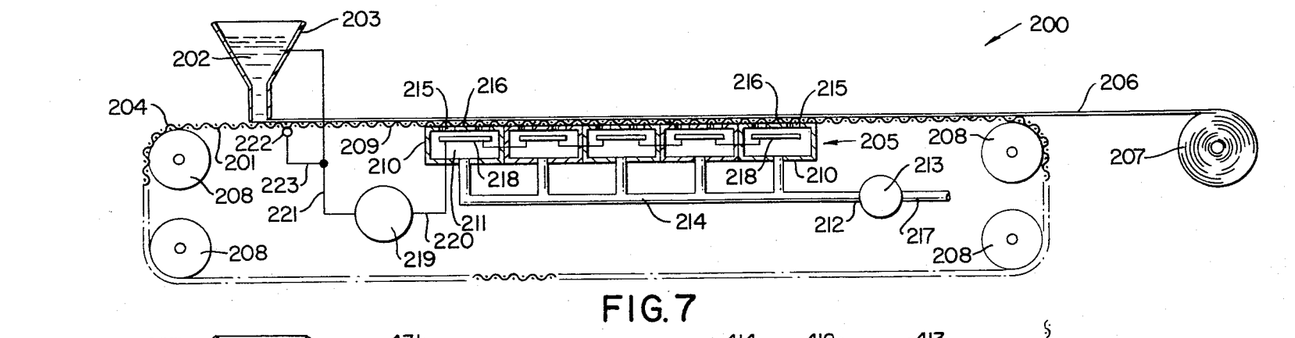
FIG. 7 is a schematic view illustrating one embodiment of a food dehydrating, paper or other material making apparatus and method of this invention.
Figure 8:
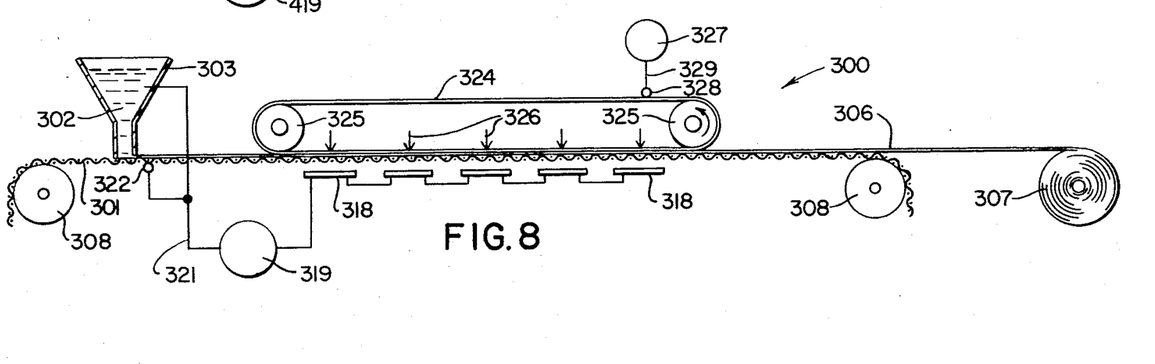
FIG. 8 is a view similar to FIG. 7 and illustrates another embodiment of this invention.
Figure 9:
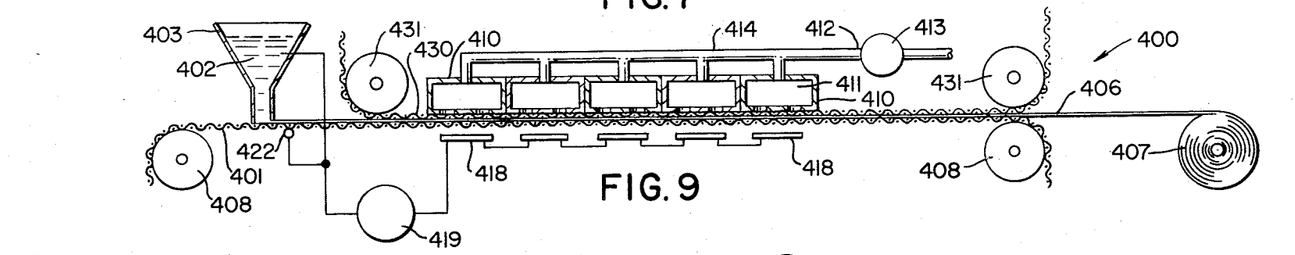
FIG. 9 is a view similar to FIG. 7 and illustrates still another embodiment of this invention.

As previously stated, one of the features of this Continuation-in-part application is to illustrate, describe and claim how certain of the previously described electrostatic features for removing liquid from moisture-bearing material can be readily utilized in improving the treating of liquid or moisture bearing materials to remove such liquid or moisture for the purpose of dehydrating food materials, paper materials or other materials containing such liquid or moisture, as shown in FIGS. 7, 8 and 9.

FIGS. 7, 8 and 9 are sometimes specifically described in connection with the making of paper from paper slurry. However, the illustrations in FIGS. 7, 8 and 9 are also applicable to the treating of liquid or moisture bearing materials, such as for the purpose of dehydrating food materials or other materials, as well as for the making of paper and the like.

As an example of using pulverized, granulated, shredded, or originally comminuted liquid and moisture bearing food materials, such materials may be fed on a screen or belt, with or without another supporting film, band or tape to be subjected to electrostatic forces disclosed in FIGS. 7, 8 and 9.

As another example of other pulverized, granulated, shredded or originally comminuted liquid and moisture bearing materials, such materials may be obtained or used in industrial processes such as in mining operations. These bearing materials may be placed directly on the screen and be discharged into a hopper or the like or may be placed on a pervious band carried by the screen from which the pervious band with the treated material may be rolled up or folded for future use.

Therefore, reference is now made to FIG. 7 wherein an improved paper making apparatus (or food material dehydrating apparatus, etc.) of this invention is generally indicated by the reference numeral 200 and comprises a continuously moving foraminous belt means 201 for receiving metered quantities of a paper slurry 202 (or food material, etc.) from a supply means 203 thereof onto the side 204 to be carried in substantially sheet form from left to right and have the liquid therein removed by improved drying means, generally indicated by the reference numeral 205, of this invention so that the dried resulting paper sheet means 206 (or dehydrated food material, etc.) can be continuously drawn off the right hand end of the foraminous belt means 210 into a hopper or the like to receive the dehydrated food, or to form a supply coil 207 of dehydrated food, or paper and the like in a conventional manner.

While the continuously moving belt means 201 can be arranged in any suitable manner to carry the slurry 202 in sheet form or in individual sheet forms from the supply means 203 to the right, the arrangement illustrated in FIG. 7 comprises a continuous foraminous belt means 201 directed around suitable guide roller means 208 and being continuously driven in a clockwise direction by any suitable driving means (not shown).

The under surface 209 of the foraminous belt means 201 is adapted to pass over an in sliding contact with a plurality of conventional suction box means 210 which have the chambers 211 thereof fluidly interconnected to the inlet side 212 of a vacuum pump means 213 by suitable conduit means 214 whereby the suction created in the chambers 211 of the box means 210 acts through the foraminous belt means 209 at opening means 215 in the tops 216 of the box means 210 to tend to draw liquid out of the moving paper slurry sheet means 206 through the foraminous belt means 201 and into the inlet side 212 of the pump means 213 so as to be expelled out the outlet side 217 thereof.

In each suction box means 210 adjacent the top 216 thereof, but in spaced relation therefrom, is disposed an electrode means 218 adapted to have one potential imposed thereon by an electrostatic device 219 interconnected thereto by lead means 220 in substantially the same manner as the electrostatic creating means previously described.

FIGS. 7, 8 and 9 each disclose diagrammatically a complete paper making apparatus and method.

For example, in FIG. 7, (and correspondingly in FIGS. 8 and 9) part of the belt means 201 extending from the supply means 203 to the first suction box 210 may be the part of the paper making apparatus which gravitationally drains the major part of the liquid from the slurry and also may include the further liquid removing and squeezing roll part of the paper making machines now being used. The suction box part 210 of FIG. 7 is a diagrammatic disclosure of the electrostatic treating means which may be substituted for all or part of the moisture heating and evaporating part of the previous paper making apparatus and methods which follow such major gravitational and squeezing liquid removing actions.

The electrodes of FIGS. 7, 8 and 9 may be protected from the electric shorting action of liquid by any of the electrode protecting and/or insulating means disclosed in the copending applications, Ser. Nos. 748,298; 769,155 and 807,539. Also, the non-uniform electrostatic field action disclosed in such copending applications may be used, if desired.

The screen or belt 201 of FIG. 7 (and correspondingly in FIGS. 8 and 9) may be grounded, ungrounded or charged in any desired manner to produce an electrostatic differential. Such screen or belt may be made of insulating material or of conductive material. The moisture or liquid bearing material may be charged, grounded or neutral.

Thus, it can be seen that by creating a potential differential between the liquid in the paper sheet slurry 206 of FIG. 7 (and correspondingly of FIGS. 8 and 9) passing over the electrode means 218 and the suction box means 210, such potential differential tends to draw such liquid from the sheet slurry 206 through the foraminous belt means 201 and into the suction box means 210 toward the electrode means 218 whereby such electrostatic principle assists the suction means 213 in removing the moisture from the paper slurry means 206 in a believed to be faster and/or improved manner than when the electrode means 218 are not utilized.

It is believed that such potential differential liquid removing operation of the electrode means 218 can be further improved by having an opposite potential imposed on the liquid in the moisture bearing material 206 while the same is being supported on the side 204 of the moving foraminous belt means 201.

For example, the other potential being created by the electrostatic means 219 can be imposed directly in the paper slurry 202 in the supply means 203 by a lead means 221 so that when the paper slurry 206 is deposited on the side 204 of the foraminous belt means 201, the liquid therein has one potential so that when the same moves over the suction box means 210, the opposite potential on the electrode means 218 will more fully attract the liquid in the paper slurry 201 to tend to draw the same through the foraminous belt means 201 into the suction box means 210.

Alternately, or in combination, rotatable electrode means 222 can be interconnected to the lead 221 of the electrostatic device 219 by a lead 223 so that a potential opposite to the potential being imposed on the electrode means 218 by the electrostatic device 219 can be imposed directly on the belt means 201, if the belt means 201 is formed of conductive material, such as being metallic foraminous belt means or the like. In this manner the foraminous belt means 201 will have a potential imposed thereon which is opposite to the potential imposed on the electrode means 218.

If the electrode 222 is utilized in combination with the foraminous belt means 201 and the electrostatic device 219 does not impose a potential in the liquid of the slurry 202 in the supply means 203, it can be seen that the liquid in the slurry 202 in the supply means 203 will be substantially at ground potential and after the same is deposited on the side 204 of the moving belt means 201, the potential imposed on the belt means 201 by the electrode means 222 will tend to cause the liquid in the paper slurry sheet means 206 to be drawn toward the belt means 201 and have the potential of the belt means 201 imposed thereon at a point adjacent the belt means 201 where it contacts the drawn liquid whereby the opposite potential on the electrode means 218 will thereafter attract the liquid adjacent the belt means 201 through the belt means 201 into the suction box means 210.

Accordingly, it can be seen that the paper making apparatus and method 200 of FIG. 7 provides improved means for drying or removing the liquid in paper slurry and the other bearing materials heretofore described and which may be formed into sheet form either as a continuous sheet of individual sheets, as desired.

Further, while the embodiment of FIG. 7 has been specifically described as a paper making apparatus, it is to be understood that such apparatus could be other apparatus that forms members from liquid or moisture bearing materials elsewhere described that are to be subsequently dried by having the liquid removed therefrom.

While the paper making apparatus and method 200 previously described for the embodiment of FIG. 7 utilizes the electrode means 218 in combination with suction box means 210 in removing the liquid from the paper slurry 206 through the foraminous belt means 201 to the other side 209 thereof, it is to be understood that it may be found that the electrode means 218 can be utilized without such suction means and effectively remove the moisture from the paper slurry 206 in such a manner that no air flow is provided through the paper slurry during the drying operation so that an improved paper is made, such as by not having a need for a subsequent rolling of the same and/or by providing an improved surface or sides thereof that cannot be provided when a suction means is utilized thereon.

For example, reference is now made to FIG. 8 wherein another paper making apparatus of this invention is generally indicated by the reference numeral 300 and parts thereof similar to the apparatus 200 previously described are indicated by like reference numerals raised in value by 100.

As illustrated in FIG. 8, the apparatus 300 is identical to the apparatus 200 previously described except that the apparatus 300 does not utilize the suction box means 210 and suction means 213 to assist in the removing of the liquid from the slurry 303 being moved by the foraminous belt means 301 from left to right as the liquid in the slurry sheet 306 is being drawn therefrom solely by the potential differential created therebetween by the electrostatic device 319 imposing one potential on the electrode means 318 and imposing an opposite potential either on the liquid in the slurry 302 in the supply means 303 and/or on the foraminous belt means 301 by the electrode means 322 or without imposing any opposite potential on the liquid in the slurry by not having its lead 321 operatively connected to the paper slurry 306.

However, it may be found that it is also desirable to provide a squeezing action on the paper sheet means 306 as it passes from left to right over the electrode means 318 to either improve the surface quality of the resulting sheet means 306 and/or assist in removing the moisture therefrom so that the resulting sheet means 306 will have the desired thickness and also the desired upper finish on the upper side thereof.

If so, a continuous metallic belt means 324 can be passed around roller means 325 so as to be disposed over the sheet means 306 and be engageable therewith while the lower run of the belt means 324 is moving from left to right in unison with the upper run of the belt members 201. By so controlling the position of the electrode means 318 relative to the moving belt means 301 and in connection with the moving belt means 324, an attractive force by the potential differential between the belt means 324 and electrode means 318 will be created to tend to pull the belt means 324 downwardly, as indicated by the arrows 326 in FIG. 8 to compact the sheet means 306 between the lower run of the belt means 324 and the foraminous belt means 301 so as to provide an improved finishing on the upper side of the sheet means 306 and/or to provide a squeezing action on the sheet means 306 to assist in the liquid removing operation thereof, or both, as well as to insure a predetermined thickness of the resulting sheet means 306 being wound on the coil means 307.

In order to improve the action of the belt means on the sheet means 306 for one or more of the purposes previously described, the electrostatic device 319 or another electrostatic device 327 can impose a potential on the belt means 324 opposite to the potential being imposed on the electrode means 318, the electrostatic device 327 having a rotatable electrode 328 disposed in engagement with the belt 324 and being interconnected to the electrostatic device 327 by a lead means 329.

Further, it may be found that by having an opposite potential imposed on the belt means 324 from the potential being imposed on the electrode 318, such potential will be imposed on the liquid in the slurry sheet 306 coming into contact therewith so that the upper liquid area of the slurry sheet 306 will have an opposite potential to the potential of the electrode means 318 and therefore be more readily drawn toward the electrode means 318 than would be the case if such upper liquid did not have the opposite potential imposed thereon. In this manner, a thicker sheet means 306 could be made by the apparatus 300 and the electrode means 318 could remove the liquid therefrom solely by the potential differential previously described.

Of course, the belt means 324 could also be utilized in combination with the apparatus 200 previously described and if such belt means were utilized therewith and it is not desired that the belt means 324 be drawn into squeezing action with the sheet 206 by the suction means being created by the suction boxes 210, such belt means 324 could be formed of foraminous material so that the same would not impede the flow of air through the sheet means 206 into the suction box means 210.

In forming other types of paper or articles, it may be found that it is desirable not to utilize the belt means 324 of the apparatus 300 and to provide a means for fluffing the paper sheet slurry as the same is being dried by the electrostatic principle of this invention.

Accordingly, another embodiment of this invention is generally indicated by the reference numeral 400 in FIG. 9 and parts thereof similar to the apparatus 200 previously described are indicated by like reference numerals raised in value by 200.

As illustrated in FIG. 9, the paper making apparatus 400 is substantially identical to the apparatus 300 of FIG. 8 wherein the electrode means 418 are being utilized without the suction box means 310 in removing the moisture from the sheet means 406 as the same moves over the electrode means 418 on the moving belt means 401.

However, another foraminous belt means 430 is passed around a pair of roller means 431 and has its lower run moving from left to right in unison with the belt means 401 so that the paper sheet means 406 will be carried therebetween. A plurality of suction box means 410, formed in a manner similar to the suction box means 210 presiously described, are disposed against the upper side of the lower run of the belt means 430 to impose a suction on the other side of the sheet means 406 as the same passes beneath the suction box means 410 whereby the suction device 413, through the conduit means 414, will not only tend to draw the moisture or liquid in the sheet means 406 upwardly into the chambers 411 and, thus, into the inlet side 412 of the suction device 413, but will also tend to maintain or fluff the sheet means 406 to a predetermined thickness while the electrode means 418 is removing the liquid from the sheet means 406 in a downward direction through the moving belt means 401 in the manner previously described.

Thus, by using the suction box means 410 in combination with the electrode means 418, the liquid in the sheet means 406 at the top thereof will be readily removed by the suction box means 410 whereas the other liquid in sheet means 406 will be drawn downwardly by the aforementioned potential differential arrangement and the sheet means 406 will have a tendency to be fluffed or maintained in a predetermined thickness during the drying operation whereby a more fluffy tissue or the like can be provided by the apparatus 400 of this invention.

Of course, it is to be understood that the apparatus 400 can be utilized for making other than fluffy tissue as the principle being disclosed by the embodiment of FIG. 9 could apply to other types of paper or articles as desired.

In addition, the suction box means 410 of the apparatus 400 could include electrode means therein similar to the electrode means 218 previously described and have imposed thereon a potential opposite to the potential being imposed on electrode means 418 to further assist the suction box means 410 in drawing the upper part of the liquid in the sheet means 406 upwardly therefrom through the foraminous belt means 430 into the suction box means 410, if desired. In addition, the foraminous belt means 430 could have such opposite potential imposed thereon in a manner similar to the electrode means 422 for imposing a potential on the moving belt means 401.

Alternately, the boxes 410 could be supplied fluid under pressure to be forced through the material on the belt means 401 toward the electrode means 418 to assist the moisture removing action of the electrode means 418.

Also, the boxes 410 could be supplied with another liquid which will pass through the perforations at the bottoms of boxes 410 and through the foraminous belt means 430 to be disposed against the moisture bearing material or moisture bearing sheet means 406. At least a part of such other liquid may be moved into the moisture bearing material or sheet means 406 by the electrostatic field action of the electrode means 418 to force out or otherwise remove at least a part of the first-named or original moisture or liquid from the bearing material 406. The fluid moving device 413 may be used as a pressure device, or may be omitted, so that the other liquid may be introduced either by gravity or pressure into the box means 410.

Such other liquid may have different properties from the properties of such first-named or original moisture or liquid in material or sheet 406. Also, such other liquid may be applied to the material or sheet 406 by other means than the boxes 410 and the belt means 430, so that such other liquid may enter the material or sheet 406 in any desired manner under the influence of a potential differential between said other liquid and the electrode means 418.

Additionally, after such other liquid has been applied or injected into the material or sheet 406, for example, as by the boxes 410, for example, such material or sheet 406 may be given further treatment to cause further movement or removal of said other liquid and/or remaining original liquid in said material or sheet 406. For example, the sheet 406 as treated by box means 410 and electrode means 418 in FIG. 9 may be further treated on the rightward continuation or extension of moving belt means 401 under which a vacuum or suction and further electrostatic treatment may be applied. This may be provided by the suction box means 210 and electrode means 218 of FIG. 7, which box means 210 and electrode means 218 could be applied under such rightward continuation or extension of the moving belt means 401 on which the bearing material or sheet 406 can be carried over such added box means 210 and electrode means 218. Such addition also could include the conduit means 214 and vacuum pump means 213 of FIG. 7.

The combined operation of parts of FIGS. 7 and 9 as above described could be used to cause an original conductive liquid, for example, in the bearing material 406 to be partially or entirely displaced by a non-conductive other liquid, for example, injected by the box means 410 and electrode means 418 of FIG. 9 into the bearing material 406, and then the liquid or liquids in the bearing material 406 after leaving the space under the box means 410 could be further moved in or removed from the bearing material 402 by the action of the added box means 210 and electrode means 218 of FIG. 7. Conversely, the original liquid may be nonconductive and the other liquid may be conductive. Also, different liquids may be used in the combined parts of FIGS. 7 and 9 and such different liquids could have various viscosities, chemical properties, such as of acrylic acid and its derivatives, for example, reactions and other properties heretofore described.

Various moisture or liquid bearing materials 406, with various original moistures or liquids in them, and various other moistures or liquids added by the box means 410, for example, may be used, in the apparatus and method of FIG. 9 alone or as modified by parts of FIG. 7 in a new and improved manner.

Therefore, it can be seen that this Continuation-in-part application provides an improved apparatus and method of treating of liquid or moisture bearing materials, such as for the purpose of dehydrating food materials or other materials as well as for the making of paper and the like.

While the forms of the invention now preferred have been disclosed as required by the statutes, other forms may be used, all coming within the scope of the claims which follow.

What is claimed is:

1. In an apparatus for removing retained moisture from moisture bearing material of the moisture absorbing type, supporting means for supporting said moisture bearing material on one side thereof, and a charged electrode means disposed adjacent said supporting means and out of electrical contact with said material while creating a substantially constant electrostatic field action that will cause at least some of the retained moisture of said moisture bearing material to leave said material and move toward said charged electrode means solely by the substantially constant electrostatic field action created by said charged electrode means.

2. In an apparatus as set forth in claim 1, said support means being electrically conductive.

3. In an apparatus as set forth in claim 1, said support means being electrically non-conductive.

4. In an apparatus as set forth in claim 1, means for charging at least one of said material and said retained moisture thereof with a charge opposite in potential to said electrode means.

5. In an apparatus as set forth in claim 1, means for electrically grounding at least one of said material and said retained moisture thereof.

6. In an apparatus as set forth in claim 1, means for compressing said moisture bearing material against said supporting means to tend to assist said electrostatic field action in removing said retained moisture from said moisture bearing material.

7. In an apparatus as set forth in claim 6, means for moving said supporting means with said moisture bearing material thereon, said means for compressing said moisture bearing material being movable in substantial unison with said supporting means whereby said-moisture bearing material is being compressed therebetween during movement of said supporting means.

8. In an apparatus as set forth in claim 1, additional means for changing the normal absorbed condition of said moisture-bearing material during the time said electrostatic field action is acting on said moisture-bearing material.

9. In an apparatus as set forth in claim 8, said additional means comprising means for compressing said moisture-bearing material.

10. In an apparatus as set forth in claim 9, said compressing means compressing said moisture-bearing material against said supporting means.

11. In an apparatus for removing retained moisture from moisture bearing material of the moisture absorbing type, supporting means for supporting said moisture bearing material, electrode means disposed adjacent said supporting means, and means creating a substantially constant electrostatic field action with said electrode means that will be imposed on at least some of the retained moisture of said moisture bearing material to cause the same to leave said material solely by the substantially constant electrostatic field action imposed thereon.

12. In an apparatus as set forth in claim 11, said means creating said electrostatic field action comprising an electrical charge on said electrode means.

13. In an apparatus as set forth in claim 12, said charged electrode means being out of electrical contact with said moisture bearing material.

14. In an apparatus as set forth in claim 13, said charged electrode means tending to attract said moisture toward said charged electrode means.

15. In an apparatus as set forth in claim 14, said means creating said electrostatic field action comprising means tending to impose a charge on said retained moisture opposite to the polarity of the charge on said electrode means.

16. In an apparatus as set forth in claim 12, said charged electrode means being in electrical contact with said moisture bearing material.

17. In an apparatus as set forth in claim 16, said means creating said electrostatic field action comprising another electrode means disposed adjacent said supported material.

18. In an apparatus as set forth in claim 17, said other electrode means being grounded.

19. In an apparatus as set forth in claim 17, said other electrode means having a polarity opposite to the polarity of the first mentioned charged electrode means.

20. In an apparatus as set forth in claim 11, additional means for changing the normal absorbed condition of said moisture bearing material during the time said electrostatic field action in acting on said moisture bearing material.

21. In an apparatus as set forth in claim 20, said additional means comprising means for compressing said moisture bearing material.

22. In an apparatus as set forth in claim 21, said compressing means compressing said moisture bearing material against said support means.

* * * * *

Dedication 3,667,130.—*Robert R. Candor*, Miami Township, Ohio and *James T. Candor*, Washington Township, Ohio. LIQUID REMOVING APPARATUS AND METHOD. Patent dated June 6, 1972. Dedication filed Oct. 17, 1980, by the inventor.

Hereby dedicates to the Public the entire term of said patent.

[*Official Gazette January 6, 1981.*]